(12) United States Patent
Zebrowski

(10) Patent No.: US 8,388,224 B2
(45) Date of Patent: Mar. 5, 2013

(54) ENGINE TURBINE TEMPERATURE MEASUREMENT

(75) Inventor: Thaddeus J. Zebrowski, Windsor, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 86 days.

(21) Appl. No.: 12/859,463

(22) Filed: Aug. 19, 2010

(65) Prior Publication Data

US 2012/0044969 A1 Feb. 23, 2012

(51) Int. Cl.
 *G01K 13/00* (2006.01)
 *G01K 7/00* (2006.01)
 *G01K 3/00* (2006.01)

(52) U.S. Cl. ........ 374/144; 374/183; 374/166; 374/110; 374/112

(58) Field of Classification Search .................. 374/144, 374/183, 166, 110, 112
See application file for complete search history.

(56) References Cited

U.S. PATENT DOCUMENTS

| | | | |
|---|---|---|---|
| 2,546,415 A * | 3/1951 | Alcock | 60/233 |
| 3,509,768 A * | 5/1970 | Tucker et al. | 374/115 |
| 4,186,605 A * | 2/1980 | Bourigault | 374/115 |
| 5,051,615 A * | 9/1991 | Rosenthal | 327/50 |
| 5,106,203 A * | 4/1992 | Napoli et al. | 374/144 |
| 6,983,223 B2 * | 1/2006 | Schuh | 702/185 |
| 2003/0219062 A1 * | 11/2003 | Egidio | 374/170 |
| 2008/0291964 A1 * | 11/2008 | Shrimpling et al. | 374/1 |
| 2009/0046762 A1 * | 2/2009 | Henshaw et al. | 374/179 |

FOREIGN PATENT DOCUMENTS

GB  2100003 A  * 12/1982

* cited by examiner

*Primary Examiner* — Mirellys Jagan
(74) *Attorney, Agent, or Firm* — Kinney & Lange, P.A.

(57) ABSTRACT

An assembly for sensing temperature in a gas turbine engine includes a first array of RTDs connected in parallel, a second array of RTDs connected in parallel, and a circuit electrically connected to the first and second arrays. The circuit determines an approximate temperature of a medium as a function of resistance of the first and second arrays.

17 Claims, 4 Drawing Sheets

ENGINE TURBINE TEMPERATURE MEASUREMENT

BACKGROUND

The present invention relates to temperature measurement, and in particular, to temperature measurement of a turbine section of a gas turbine engine. A gas turbine engine typically has a compressor section, which compresses and supplies gas to a burner or combustor section, which adds fuel, combusts the gas and supplies the gas to a turbine section, which extracts energy from the hot compressed gas to drive the compressor section and other components depending on the application. Temperature sensors are placed at various portions of the gas turbine engine to provide temperature feedback for various components as well as the gas as it flows along its flow-path.

In some gas turbine engines an array of thermocouples is positioned circumferentially around the turbine section. The thermocouples are typically wired together in parallel, using expensive thermocouple wire and further requiring a cold junction RTD (resistance temperature detector) reference circuit. The array averages the temperature sensed by each thermocouple to create an average temperature. However, if one of the thermocouples fails, the average sensed temperature can drift to a value higher or lower than what would be determined if all thermocouples were functional. Moreover, it may not be readily apparent that one or more thermocouples have failed until the last thermocouple in the array fails. Thus, such thermocouple circuits can be relatively expensive, inaccurate, and unreliable.

SUMMARY

According to one embodiment of the present invention, an assembly for sensing temperature in a gas turbine engine includes a first array of RTDs connected in parallel, a second array of RTDs connected in parallel, and a circuit electrically connected to the first and second arrays. The circuit determines an approximate temperature of a medium as a function of resistance of the first and second arrays.

Another embodiment of the present invention is a method for sensing temperature. The method includes sensing resistance of a first array of RTDs connected in parallel, wherein the first array of RTDs senses temperature of a medium in a gas turbine engine, sensing resistance of a second array of RTDs connected in parallel, wherein the second array of RTDs senses temperature of the medium in the gas turbine engine, and determining an approximate temperature of the medium as a function of sensed resistance of the first and second arrays.

DETAILED DESCRIPTION

Figure 1:
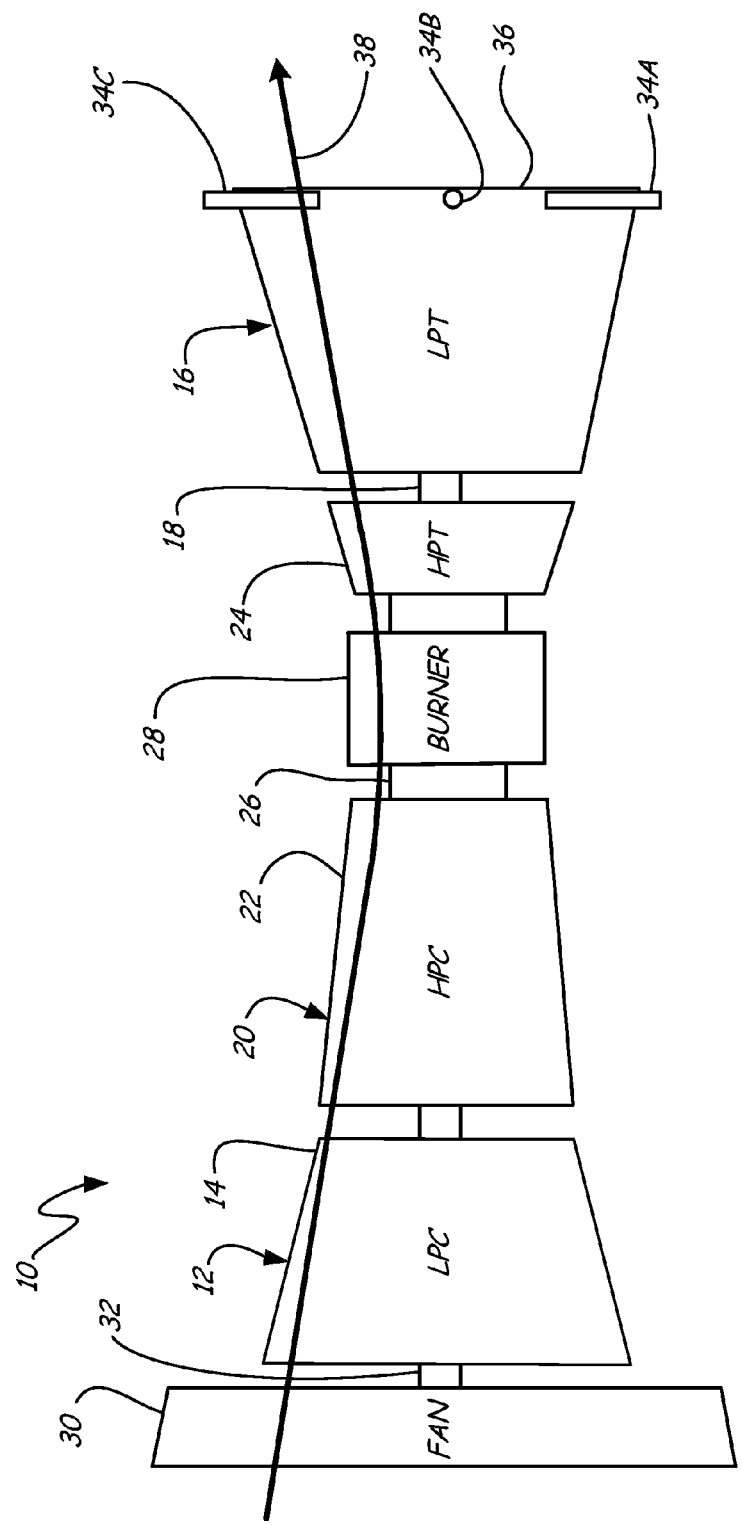
FIG. 1 is a schematic side view of a gas turbine engine.

FIG. 1 is a schematic side view of gas turbine engine 10. Gas turbine engine 10 includes low pressure spool 12 (which includes low pressure compressor 14 and low pressure turbine 16 connected by low pressure shaft 18), high pressure spool 20 (which includes high pressure compressor 22 and high pressure turbine 24 connected by high pressure shaft 26), burner 28, fan 30, and fan shaft 32. The general construction and operation of gas turbine engines is well-known in the art, and therefore detailed discussion here is unnecessary.

Temperature probes 34A, 34B, and 34C are positioned near aft portion 36 of low pressure turbine 16 and extend into flow-path 38.

Figure 2A:
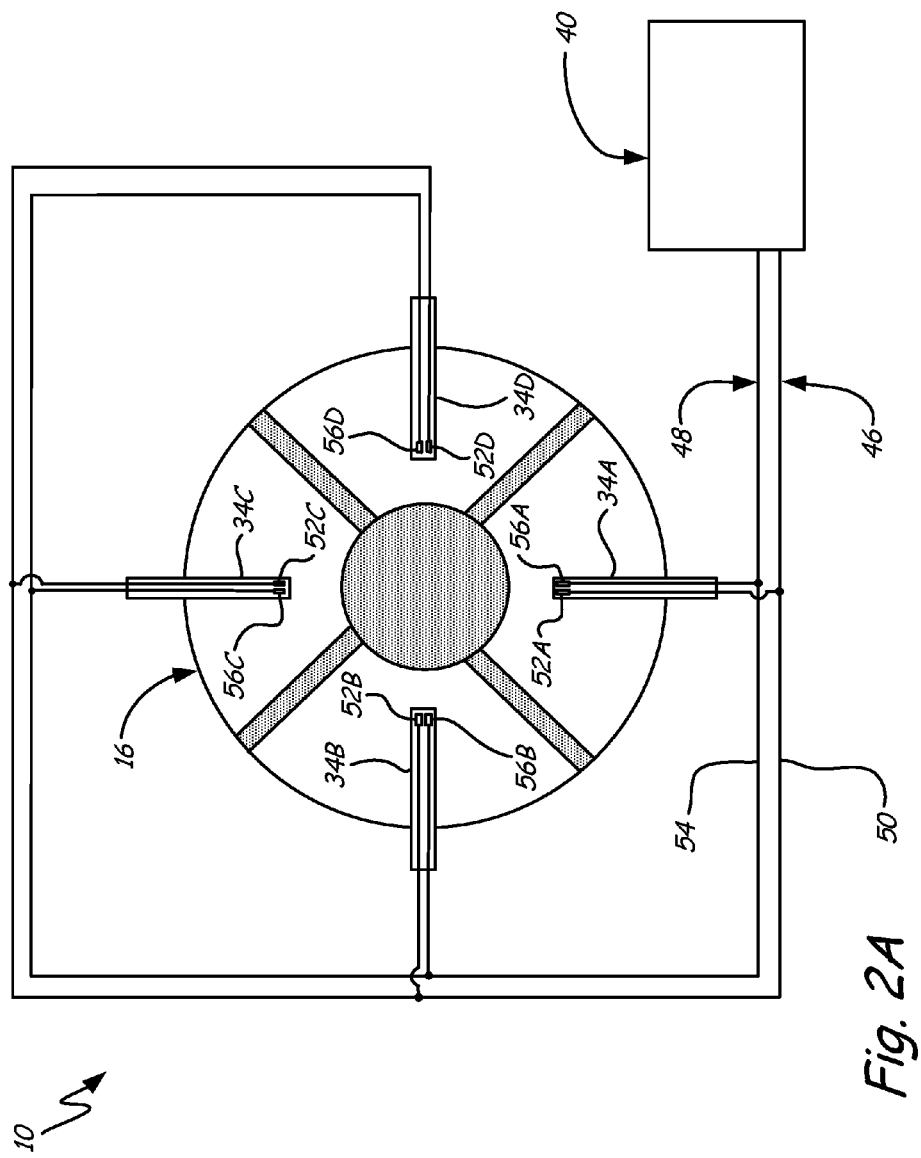
FIG. 2A is a schematic rear view of the gas turbine engine of FIG. 1.

FIG. 2A is schematic rear view of gas turbine engine 10. Engine controller 40 is a two channel engine controller for control of gas turbine engine 10. Engine controller 40 connects to various engine sensor inputs, including first array 46 and second array 48, respectively. First array 46 includes wires 50 connecting RTDs (resistance temperature detectors) 52A, 52B, 52C, and 52D in parallel. Second array 48 includes wires 54 connecting RTDs 56A, 56B, 56C, and 56D in parallel. Wires 50 and 54 can be made of copper or other material suitable for the application. First array 46 is positioned circumferentially around low pressure turbine 16 of gas turbine engine 10 such that RTDs 52A, 52B, 52C, and 52D are positioned inside probes 34A, 34B, 34C, and 34D, respectively. Second array 48 is also positioned circumferentially around low pressure turbine 16 of gas turbine engine 10 such that RTDs 56A, 56B, 56C, and 56D are also positioned inside probes 34A, 34B, 34C, and 34D, respectively. Thus, each of RTDs 52A, 52B, 52C, and 52D are positioned with and substantially adjacent to a corresponding one of RTDs 56A, 56B, 56C, and 56D so as to be able to sense temperature of a medium of compressed and combusted gas flowing along flow-path 38 (shown in FIG. 1).

In alternative embodiments, first array 46 and second array 48 can each have more or less than four RTDs, paired together and positioned in a corresponding number of probes.

Figure 2B:
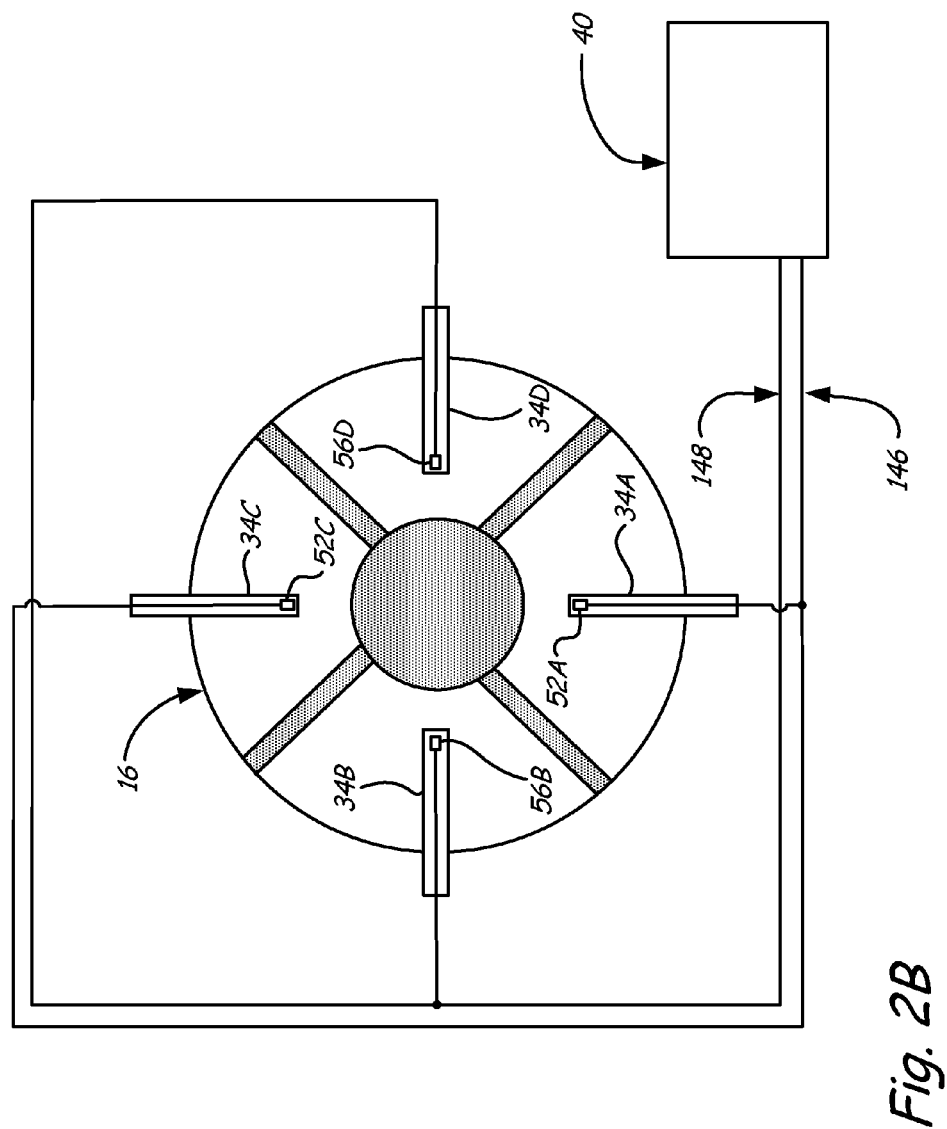
FIG. 2B is schematic rear view of a second embodiment of a gas turbine engine.

FIG. 2B is schematic rear view of a second embodiment of gas turbine engine 10. First array 146 is similar to first array 46 (shown in FIG. 2A) except first array 146 has only two RTDs 52A and 52C. Second array 148 is similar to second array 48 (shown in FIG. 2A) except second array 148 has only two RTDs 56B and 56D. Each RTD 52A, 56B, 52C, and 56D is individually positioned in radially alternating probes 34A, 34B, 34C, and 34D, respectively, so that each RTD 52A and 52C of first array 146 is substantially between RTDs 56B and 56D of second array 148.

In alternative embodiments, first array 146 and second array 148 can each have more than two RTDs, positioned in a suitable number of alternating probes. In further alternative embodiments, RTDs of first array 146 and second array 148 can be individually positioned in probes that are not radially alternating but that have suitable positions for a particular application.

Figure 3:
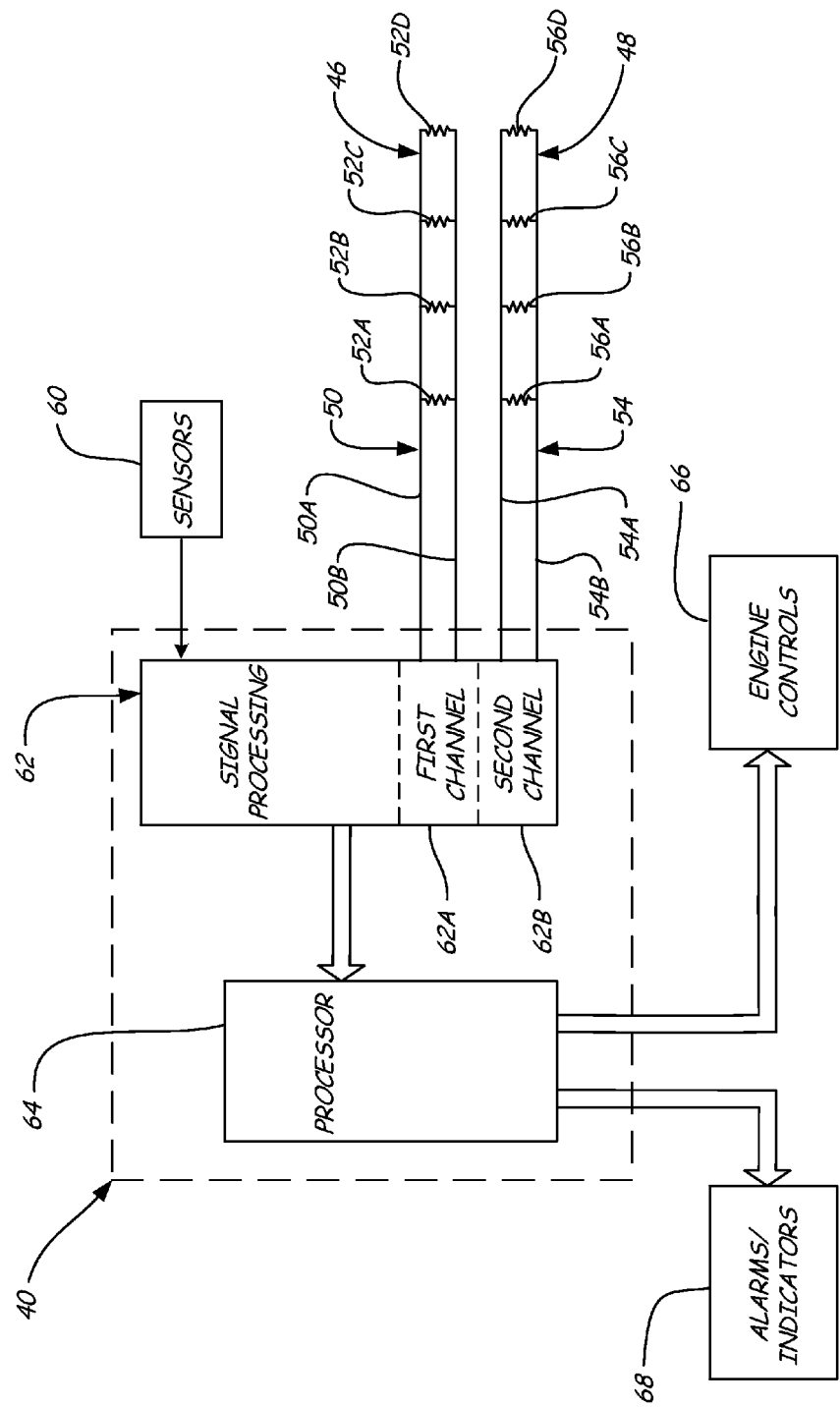
FIG. 3 is a schematic circuit diagram of an engine controller with first and second arrays of RTDs and other sensors.

FIG. 3 is a schematic circuit diagram of engine controller 40 connected to first array 46, second array 48, and other sensors 60. Though engine controller 40 will be described primarily with respect to the embodiment shown in FIG. 2A, the description is equally applicable to the embodiment shown in FIG. 2B.

Sensors 60 include pressure, temperature, vibration, and other sensors that provide feedback data about the operation of gas turbine engine 10 (shown in FIG. 1). First array 46 and second array 48 both provide temperature data of gas exiting low pressure turbine 16. Sensors 60, first array 46, and second array 48 are all connected to signal processing circuitry 62. First array 46 is connected to first channel 62A and second array 48 is connected to second channel 62B of signal processing circuitry 62. Data from sensors 60, first array 46, and second array 48 is received by signal processing circuitry 62 and then transmitted to processor 64 in a format usable by processor 64. Based on the sensed data, processor 64 generates and outputs engine controls 66 as well as other alarms or indicators 68. In the illustrated embodiment, engine controller 40 is shown with a single processor 64 receiving information from an integrated signal processing circuitry 62 with first and second channels 62A and 62B. In an alternative embodiment, processor 64 can include two separate processors, and first channel 62A can be electrically isolated from second channel 62B. Thus, first array 46 and second array 48 can each be connected to its own separate channel 62A and 62B and its own separate processor 64 such that a failure along a circuit of first array 46, first channel 62A, and a corresponding processor does not affect a circuit of second array 48, second channel 62B, and a corresponding processor.

RTDs 52A, 52B, 52C, and 52D are electrically connected in parallel between first lead 50A and second lead 50B of wires 50. RTDs 56A, 56B, 56C, and 56D are electrically connected in parallel between first lead 54A and second lead 54B of wires 54. An RTD is a device with a temperature dependant resistance. Temperature can be calculated because each RTD 52A, 52B, 52C, 52D, 56A, 56B, 56C, and 56D has a known resistance at any given temperature. In one embodiment, each RTD 52A, 52B, 52C, 52D, 56A, 56B, 56C, and 56D can be of the same type with substantially the same resistance at any particular temperature. In other embodiments, one or more RTDs can be of a different type. Engine controller 40 can inject a current into first array 46, measure the resulting voltage across RTDs 52A, 52B, 52C, and 52D, and convert the measured voltage into a digital format. Engine controller 40 can then calculate a total resistance of first array 46 using the equation: (Total Array Resistance)= (Measured Voltage)/(Current). Engine controller 40 can calculate an average resistance of RTDs 52A, 52B, 52C, and 52D using the equation: (Average RTD Resistance)=(Total Array Resistance)×(Number of RTDs in Array). Engine controller 40 can then calculate an average temperature sensed by RTDs 52A, 52B, 52C, and 52D based on the Average RTD Resistance.

Similarly, engine controller 40 can inject a current into second array 48, measure the resulting voltage across RTDs 56A, 56B, 56C, and 56D, and convert the measured voltage into a digital format. Engine controller 40 can then calculate a total resistance of second array 48 using the equation: (Total Array Resistance)=(Measured Voltage)/(Current). Engine controller 40 can calculate an average resistance of RTDs 56A, 56B, 56C, and 56D using the equation: (Average RTD Resistance)=(Total Array Resistance)×(Number of RTDs in Array). Engine controller 40 can then calculate an average temperature sensed by RTDs 56A, 56B, 56C, and 56D based on the Average RTD Resistance.

If RTDs 52A, 52B, 52C, and 52D are positioned sufficiently near RTDs 56A, 56B, 56C, and 56D (such as the positioning shown in FIGS. 2A and 2B), the average temperature sensed by first array 46 should be approximately equal to the average temperature sensed by second array 48. This allows for a relatively accurate approximation of temperature of the sensed medium (in the illustrated case, gas exiting low pressure turbine 16). Having a two channel engine controller 40 with redundant first and second arrays 46 and 48 allows engine controller 40 to obtain the relevant temperature data even if one of first and second arrays 46 and 48 or its corresponding channel fail for any reason.

Engine controller 40 can rely on the temperature data from first array 46 and second array 48 for various purposes. For example, engine controller 40 can adjust engine controls 66 to automatically reduce the amount of fuel supplied to gas turbine engine 10 in response to average temperature sensed by first array 46 and/or second array 48 exceeding a threshold. Additionally, or alternatively, engine controller 40 can use average temperature sensed by first array 46 and/or second array 48 to determine engine deterioration. This is because temperature of turbine exhaust gas tends to increase as a gas turbine engine deteriorates. Thus, if average temperature sensed by first array 46 and/or second array 48 exceeds a threshold, engine controller 40 can determine that gas turbine engine 10 requires an overhaul and output one or more corresponding alarms or indicators 68.

If one of the RTDs in first array 46 or second array 48 fails, it can be determined in multiple ways. First, RTD failure can be determined by considering signals from just one of first array 46 or second array 48. For example, if an RTD in first array 46 failed, the resistance of first array 46 would abruptly increase, resulting in an abrupt increase of the measured voltage. Based on that abrupt increase, engine controller 40 can determine that an RTD in first array 46 has failed. Similarly, engine controller 40 can also determine that an RTD has failed based upon an abrupt increase in the resistance of second array 48. Thus, engine controller 40 can detect failure of RTDs 52A, 52B, 52C, and 52D as a function of the resistance of first array 46 and detect failure of RTDs 56A, 56B, 56C, and 56D as a function of the resistance of second array 48. After detecting a failure, engine controller 40 can respond by providing an output of one or more alarms or indicators 68. Engine controller 40 can provide a first failure indication as a function of resistance of first array 46 and a second failure indication as a function of resistance of second array 48. The first and second failure indications can be provided in response to an abrupt change in resistance of first array 46 or second array 48, respectively. Providing separate failure indications can inform maintenance personnel which of first array 46 or second array 48 requires maintenance.

Second, RTD failure can be determined by considering signals from both of first array 46 and second array 48. For example, temperature measured by first array 46 can be compared to temperature measured by second array 48. If those temperatures differ substantially, engine controller 40 can determine that an RTD has failed in either first array 46 or second array 48. Thus, engine controller 40 can detect failure of any of the RTDs as a function of both the resistance of first array 46 and the resistance of second array 48. Engine controller 40 can then provide an output of one or more alarms or indicators 68 in response to detecting an RTD failure by comparing the resistance of first array 46 to the resistance of second array 48.

Even after an RTD in first array 46 or second array 48 fails, both arrays can still be used to provide relevant temperature data to engine controller 40. For example, as explained above, engine controller 40 can calculate an average resistance of RTDs 52A, 52B, 52C, and 52D using the equation: (Average RTD Resistance)=(Total Array Resistance)×(Number of RTDs in Array). If one RTD fails, such as RTD 52D, engine controller 40 can detect an abrupt increase in resistance of first array 46 and respond by automatically adjusting its algorithm used to determine temperature by correcting the Number of RTDs in Array variable. Thus, engine controller 40 can calculate an average resistance of RTDs 52A, 52B, and 52C (without failed RTD 52D) using the equation: (Average RTD Resistance)=(Total Array Resistance)×(Number of RTDs in Array Currently Functioning). Engine controller 40 can confirm that the algorithm used to determine temperature has been properly adjusted by comparing the average temperature calculated from first array 46 with average temperature calculated from second array 48, which should be approximately equal.

Therefore, temperature can be sensed relatively accurately both before and after an RTD failure. This allows an aircraft to continue receiving accurate temperature data until a suitable opportunity exists for maintenance. For example, if an RTD fails in flight, an aircraft can continue operation and the failed RTD can be repaired at the conclusion of the flight. Alternatively, the aircraft can continue to make successive flights without having the failed RTD repaired until a regularly scheduled maintenance time.

The temperature measurement system of the present invention can have numerous benefits and advantages. For example, first and second arrays 46 and 48 having RTDs connected in parallel can be simpler, less expensive, more reliable, and more accurate than thermocouple designs. Reliability is further increased because, even if an RTD does fail, that failure does not substantially reduce accuracy since it can be detected and compensated. Moreover, RTD failures can be detected and repaired prior to a failure of an entire array.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims. For example, first and second arrays 46 and 48 need not necessarily be positioned near aft portion 36 of low pressure turbine 16, but can be positioned virtually anywhere where a reliable average temperature reading is sought. Moreover, the various inputs, outputs, and connections of engine controller 40 need not be configured exactly as illustrated, but may be modified to have circuitry suitable for a particular application.

The invention claimed is:

1. An assembly for sensing temperature of a medium in a gas turbine engine, comprising:
   a first array of RTDs connected in parallel;
   a second array of RTDs connected in parallel; and
   a circuit electrically connected to the first and second arrays for determining an approximate temperature of the medium as a function of a first total resistance of the first array, a second total resistance of the second array, and a comparison of the first total resistance to the second total resistance, wherein the circuit determines failure of one or more of the RTDs in the second array of RTDs by detecting an abrupt change in the second total resistance, independent of the first total resistance.

2. The assembly of claim 1, wherein the circuit determines failure of one or more of the RTDs in the first array of RTDs by detecting an abrupt change in the first total resistance, independent of the second total resistance.

3. The assembly of claim 1, wherein the circuit calculates an average resistance of the first array of RTDs by multiplying the first total resistance with a number of RTDs of the first array currently functioning.

4. The assembly of claim 1, wherein a same type of RTD is used in both the first array and the second array.

5. The assembly of claim 1, and further comprising:
   a gas turbine engine wherein the first and second arrays are positioned circumferentially around a turbine section of the gas turbine engine.

6. The assembly of claim 5, and further comprising:
   a two-channel engine controller having a first input connected to the first array and a second input connected to the second array, wherein the circuit is part of the two channel engine controller.

7. An assembly comprising:
   a first array of RTDs connected in parallel;
   a second array of RTDs connected in parallel;
   a gas turbine engine, wherein the first and second arrays are positioned circumferentially around the gas turbine engine; and
   a two-channel engine controller having a first input connected to the first array and a second input connected to the second array, wherein the two-channel engine controller detects failure of one or more of the RTDs of the first array as a function of a first total resistance of the first array independent of the second array, and detects failure of one or more of the RTDs of the second array as a function of a second total resistance of the second array independent of the first array.

8. The assembly of claim 7, wherein the two-channel engine controller provides a failure indication in response to a detected RTD failure.

9. The assembly of claim 7, wherein the two-channel engine controller automatically adjusts an algorithm used to determine an approximate temperature of a sensed medium in response to a detected RTD failure.

10. The assembly of claim 7, and further comprising:
    a plurality of probes extending into a flow-path of a turbine section of the gas turbine engine, wherein the RTDs are positioned inside the plurality of probes.

11. The assembly of claim 10, wherein each RTD of the first array is positioned inside one of the plurality of probes with a corresponding RTD of the second array.

12. The assembly of claim 10, wherein the RTDs of each array are positioned in alternating probes such that each RTD of the first array is substantially between a pair of RTDs of the second array.

13. A method for sensing temperature, the method comprising:
    sensing resistance of a first array of RTDs connected in parallel, wherein the first array of RTDs senses temperature of a medium in a gas turbine engine;

sensing resistance of a second array of RTDs connected in parallel, wherein the second array of RTDs senses temperature of the medium in the gas turbine engine;

determining an approximate temperature of the medium as a function of a first total resistance of the first array and a second total resistance of the second array; and providing a first failure indication of one or more of the RTDs of the first array as a function of the first total resistance of the first array, independent of the second total resistance of the second array.

14. The method of claim 13, wherein determining an approximate temperature of the medium further includes a comparison of the first total resistance to the second total resistance.

15. The method of claim 13, and further comprising:
providing a second failure indication of one or more of the RTDs of the second array as a function of a second total resistance of the second array, independent of the first total resistance of the first array.

16. The method of claim 13, and further comprising:
adjusting an algorithm used to determine the approximate temperature of the medium in response to the first total resistance increasing abruptly, wherein both the first and second arrays are used to determine approximate temperature after the algorithm is adjusted.

17. The method of claim 16, wherein adjusting the algorithm is performed automatically by an engine controller for a gas turbine engine.

* * * * *